Figure 1A:
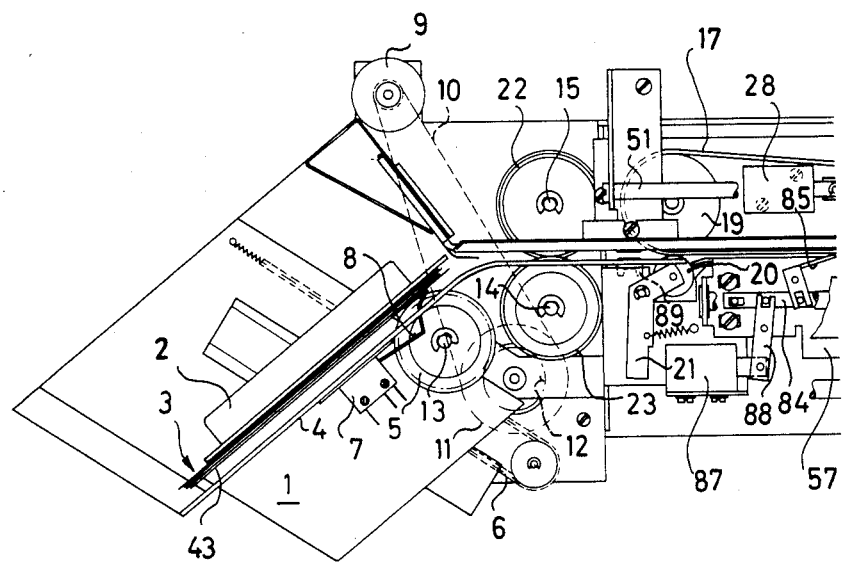

United States Patent [19]

Görner et al.

[11] Patent Number: 4,798,944
[45] Date of Patent: Jan. 17, 1989

[54] DOCUMENT ENCODING DEVICE WITH DOCUMENT READING STATION AND DOCUMENT VIEWING STATION

[75] Inventors: Horst Görner, St. Georgen; Horst Dyma, Villingen-Schwenningen, both of Fed. Rep. of Germany

[73] Assignee: Mannesmann Kienzle GmbH, Villingen, Fed. Rep. of Germany

[21] Appl. No.: 812,969

[22] Filed: Dec. 24, 1985

[30] Foreign Application Priority Data

Dec. 24, 1984 [DE] Fed. Rep. of Germany ....... 3447429

[51] Int. Cl.⁴ .............................................. G06K 13/00
[52] U.S. Cl. ................................... 235/475; 209/583; 235/449; 271/258
[58] Field of Search ....................... 235/449, 475, 477; 271/258; 209/583, 547, 548

[56] References Cited

U.S. PATENT DOCUMENTS

| 3,293,629 | 12/1966 | Oliver | 235/449 X |
| 3,731,060 | 5/1973 | Weinstein | 209/583 |
| 3,976,290 | 8/1976 | Wallace | 271/258 X |
| 4,082,945 | 4/1978 | van de Goor et al. | 235/449 X |

Primary Examiner—David L. Trafton
Attorney, Agent, or Firm—Toren, McGeady & Associates

[57] ABSTRACT

The invention describes a document encoder which, in addition to the printing devices for imprinting the document (43) with the encoded values, is also combined with a stack feed (1) and a reading station (44) for already encoded values. The reading station (44) for automatically reading pre-encoded values and the viewing station (45) for visually reading data which are to be keyed in manually are arranged one behind the other, and the documents (43) are driven transversely relative to the normal transporting direction for shifting them from the reading station (44) into the viewing station (45) by means of separate transporting means (32 to 42). The viewing station (45) is arranged in front of the reading station (44) and, together with the reading station (44) and the document single feed (1), forms an additional module which can be employed as a front and lower construction, respectively, of the actual encoding printer.

13 Claims, 5 Drawing Sheets

DOCUMENT ENCODING DEVICE WITH DOCUMENT READING STATION AND DOCUMENT VIEWING STATION

The invention is directed to an encoding device with a reading device for the mechanical reading of pre-encoded markings comprising a viewing station for stopping the document for the visual reading of handwritten markings and one or more adjoining printing stations for encoding printing of the documents, wherein the documents are moved between the reading, viewing and printing stations by means of transporting means.

In document encoding devices the desire is often expressed that, in addition to the possibility of the manual entry of data to be encoded, a reading device should also be available which reads pre-encoded data already on the document. In this case, the document generally runs past in front of the stationary reading device. When the reading station is arranged in front of the viewing station in the transporting direction of the document then the document is stopped in the viewing station in order to give the user the possibility of reading the values to be encoded from the document and keying them in manually. Such an arrangement of the document reading station in front of the viewing station in the document transporting direction results in that whenever a document must be read repeatedly because of a deficient encoding which is not recognized, an interruption in the operation of the document throughput takes place because the document must then be guided past the reading station repeatedly, for example, in circles, or is immediately deposited in a compartment for "rejections".

A further disadvantage of such an arrangement of the reading station in front of the viewing station is that there is necessarily a greater space requirement for the entire document encoder so that it is difficult to construct the encoding device as a desktop device. As a rule, document encoders in which the reading station and the viewing station are arranged in combination are constructed as upright models because the space requirement is too great for a desktop device.

In contrast to this, it is the object of the invention to enable an overlapping processing of the documents in the reading station and in the viewing station in such a way that the document can be read in the reading station as many as two or three times, while the preceding or subsequent document can be stopped in the viewing station for visual reading. In this manner the slightest interruptions and delays occur in the document flow. In addition, the invention has the object of arranging the two stations in such a way that a simple, manual access to the document viewing station is possible.

In order to meet this object the invention is characterized in that a shifting of the documents transversely to the transporting direction is effected by means of separate transporting means in such a way that the reading and viewing stations are arranged one behind the other in the viewing direction of the user, wherein the viewing station is preferably arranged in front of the reading station.

In order to achieve the most compact possible constructional form the invention is further characterized in that the document reading station is arranged not only behind the document viewing station, but also beneath it in an offset manner in such a way that when the document is shifted by means of the separate transporting means there is effected not only a forward displacement, but also a lifting of the document to a second level in which are arranged the viewing station and the printing station.

Such an arrangement then also makes it possible to construct the document store container, the transporting means for the transporting of the document to the reading station and the reading station itself as a module in the form of a front or lower construction of the actual encoding printer.

It is also an important characteristic feature of the invention that the document viewing station is open at the top. This makes it possible to remove documents which have been rejected and to insert a substitute document which occupies the same place in the document sequence as the rejected document.

According to the rest of the invention the separate transporting means for the movement of the documents from the reading station to the viewing station comprise friction rollers which are provided with serrated projections and which are made to engage with and are driven by contact pressure means for changing the documents. The serrated projections of the friction rollers serve the document as a stop for lifting same.

The contact pressure means comprise pawls which, when the document is lifted, enter into a cut out portion between each two friction rollers and press the document into the serrated projections and accordingly prevent the document from dropping back into the reading station.

In order to prevent a throwing out of the document a vertically adjustable stop is provided which defines the path of the document at the top and which simultaneously ensures that the document is moved through the friction rollers into the document viewing station.

Additional details of the invention follow from a detailed description of an embodiment example of the invention according to the attached drawings.

Figure 1B:
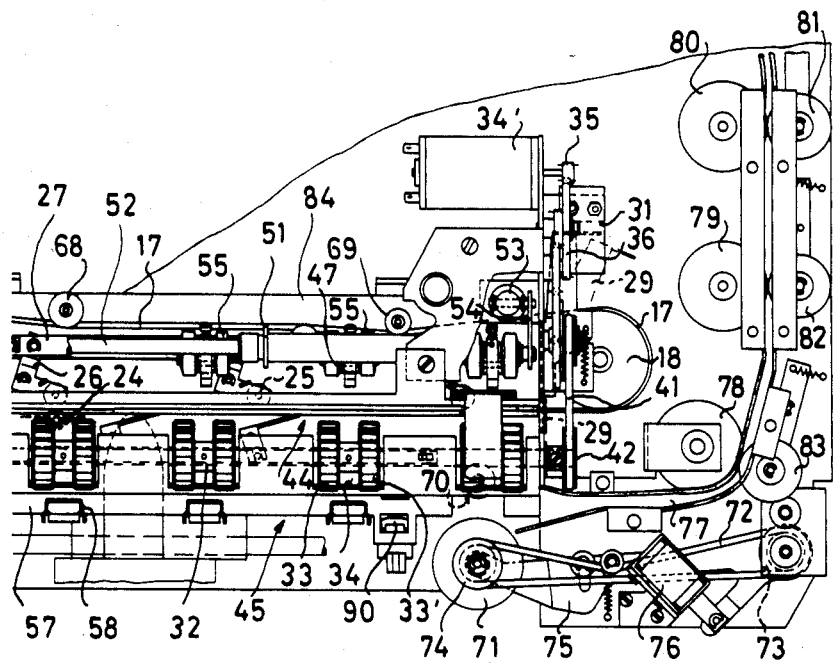
Figure 2:
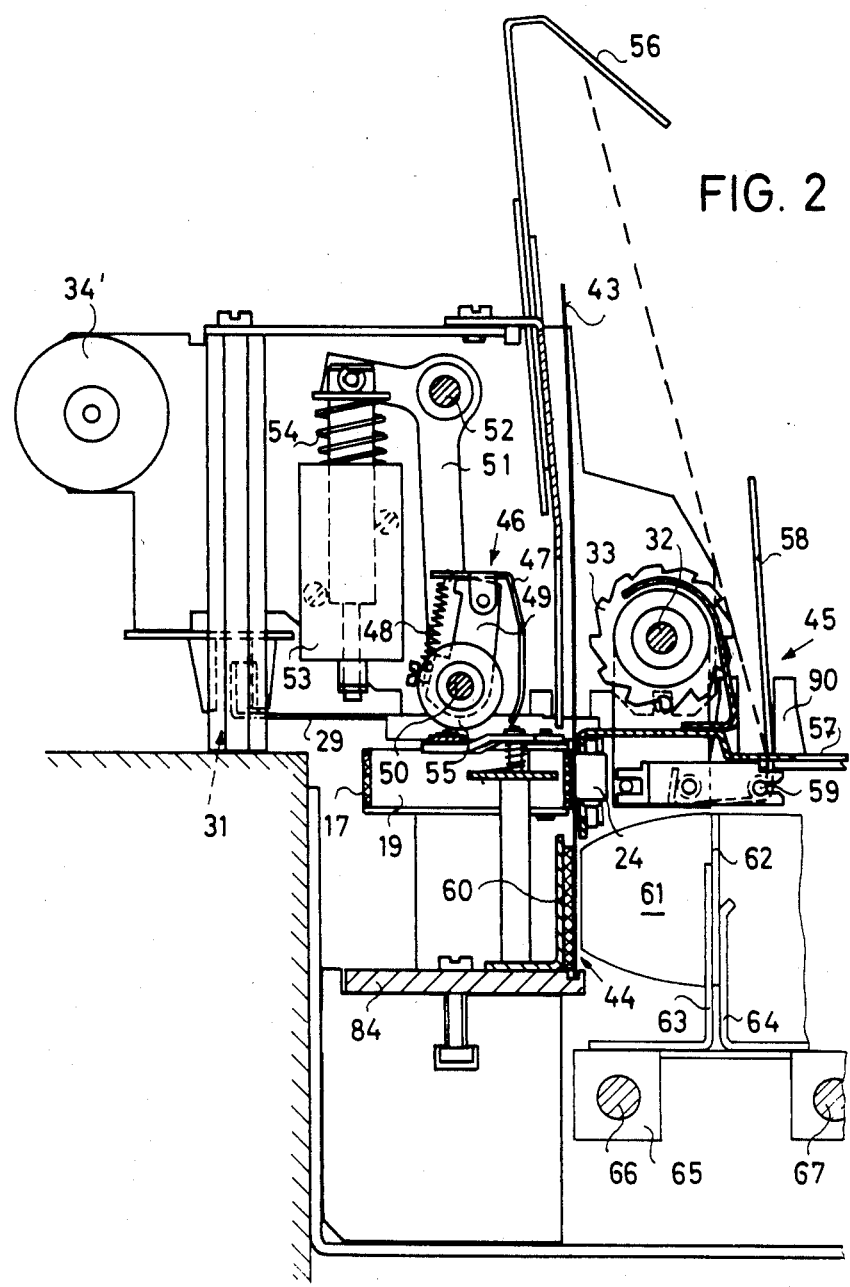
Figure 3:
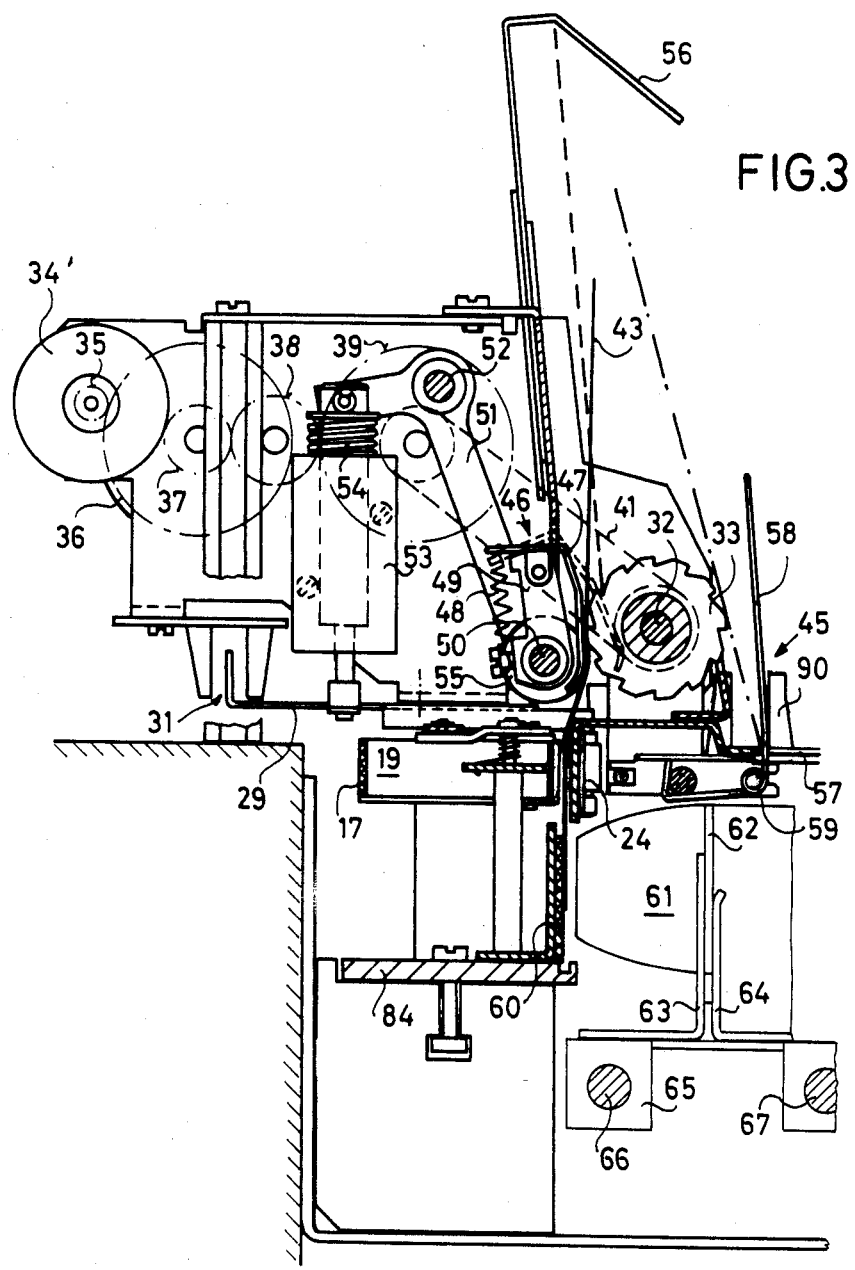
Figure 4:
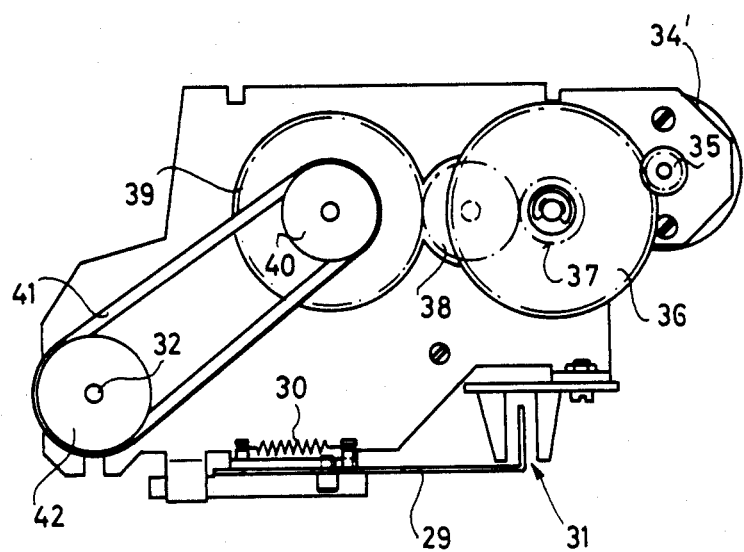

FIGS. 1A and 1B show a top view of the document encoding device, according to the invention, to the extent that the invention is concerned with it, FIG. 2 shows a lateral section through the arrangement in the position in which the document is transported laterally and upright, i.e. in the line direction, FIG. 3 shows the document during its movement from the reading station into the viewing station, and FIG. 4 shows the gear unit for the separate transporting means.

The invention is first described in broad outline by means of FIGS. 1A and 1B. The document store station 1 is arranged on the left side. A movable stop 2 presses the document stack 3 against a guide wall 4 and against a document picking roller 5 for the document picking, respectively. The movable stop 2 is under the influence of a long tension spring 6 which causes the stop 2 to press the document stack 3 against the document picking roller 5 always with approximately constant contact pressure. A micro-switch 7 senses with its switching arm 8 whether documents are still contained in the document store station 1. A motor 9 drives a toothed gear wheel 12 by means of a belt 10 and a belt roller 11. The toothed gear wheel 12 drives other toothed gear wheels which are connected on the one hand with the axle 13 of the document picking roller 5 and, on the other hand, with the axle 14 of the first document transporting roller 23. The gear unit of the motor 9 also comprises an additional toothed gear wheel, in addition to the toothed gear wheel 12 and the two toothed gear wheels connected with the axles 13 and 14, which additional gear wheel is connected with the axle 15. The device is arranged in such a way that the two axles 14 and 15 are driven in opposite directions so that documents which are inadvertently fed two at a time are held back by means of the oppositely running movement of the document transporting rollers 22 and 23. A sensor 89 checks whether a document is still being transported and switches off the motor 9, as the case may be, if an interruption in the document transport is required.

The documents 43 of the stack 3 are transported into the document reading station 44 by means of a transporting belt 17 which is guided via two drive rollers 18 and 19. Rollers 68, 69 keep the transporting belt 17 tensioned. The drive rollers 18 and 19 are driven by means of an electromotor, not shown, in such a way that the belt 17 in FIGS. 1A and 1B runs from left to right in the direction of the reading station 44. A contact pressure roller 20 on a lever 21 ensures that the document fed from the single feed rollers 22 and 23 is taken over by the transporting belt 17. The belt 17 cooperates with the contact pressure rollers 24 which are held in a guide plate. The coupling rollers 25, each of which is supported on a lever 26, cause the belt 17 to press against the contact pressure rollers 24 so that the document is clamped between the belt 17 and the contact pressure rollers 24 as soon as the coupling rollers 25 are in the working position. The levers 26, which carry the rollers 25, are swivelably supported on a rod 27. The rod 27 can be swiveled from right to left by means of an electromagnet 28 in FIGS. 1A and 1B so that the coupling rollers 25 are swiveled in the counterclockwise direction and the document is no longer clamped between the belt 17 and the contact pressure rollers 24. The document is then transported by means of the belt 17 and the contact pressure rollers 24 until reaching a swivelable stop 29 (see also FIG. 4) which enters a light barrier device 31 during its swiveling against the force of a spring 30 and accordingly reports to the motor, which drives the transporting belt 17, that the document has arrived in its reading station 44. However, the release of the document for transporting into the viewing station by means of the electromagnet 28 is effected only when the control reports that the document is correctly read and the viewing station is free.

An axle 32, which carries friction rollers 33 provided with serrated projections, is arranged in front of document 43 (see FIGS. 1 to 3). In each instance, two friction rollers 33 and 33' form a pair which is arranged at both sides of a cut out portion 34. By means of a corresponding gear unit the axle 32 is driven by a motor 34' (FIG. 4) by means of a gear unit consisting of the toothed gear wheels 35, 36, 37, 38 and 39, as well as by means of a belt drive 40, 41 and 42 (FIG. 4) when the motor 34' is switched on, which is effected by means of the control. The friction rollers 33 are part of the separate transporting means according to the invention by means of which the documents 43 are transported from the document reading station 44 into the document viewing station 45.

Guide pawls 85 can be seen in FIGS. 1A and 1B which, during the transportation of the document 43, flatten the latter if it should be creased so that the document is introduced securely between the friction rollers 33 and the contact pressure means 46 of the reading station 44. The guide pawls 85 are swivelably connected with a rod 86 which can be swiveled into the active position via a swivel lever 88 by means of an electromagnet 87.

As shown by FIG. 2, the separate transporting means 33 are normally not engaged with the documents 43. This is effected by means of contact pressure means 46 which comprise pawls 47 and contact pressure rollers 55, wherein the pawls 47 are influenced in the counterclockwise direction by means of a spring 48. The pawls 47 and contact pressure rollers 55 are supported on a common shaft 50 by means of holders 49. The shaft 50 is held between two rods 51. The rods 51 are arranged on a shaft 52 and can be swiveled in the counterclockwise direction from the position according o FIG. 2 into the position according to FIG. 3 by means of an electromagnet 53, wherein the spring 54 is tensioned.

FIG. 2 shows the contact pressure means 46 in the unexcited position of the electromagnet 53 in which they are inactive, i.e. they do not contact the document 43. This is the case during the transporting of the document 43 because the contact pressure means may not hinder the transporting of the document in the line direction, that is, vertically with respect to the plane of FIGS. 2 and 3. However, if the contact pressure means 46 are swiveled by means of the electromagnet 53, as seen in FIG. 3, then the contact pressure rollers 55 press the document 43 against the separate transporting means in the form of the friction rollers 33, the pawls 47 resiliently contact the document 43. As soon as the document is transported by means of the friction rollers 33 far enough into the separate transporting means that the lower edge of the document 43 is located at the tooth base of one of the saw teeth of the friction rollers 33, the document is transported farther out of the position which is shown in solid lines in FIG. 3 into the position in which the document 43 is drawn in dashed lines. In this position the pawls 47 enter between the friction rollers 33 into their cut out portions 34 and prevent the document 43 from dropping back out of the position drawn in dashed lines so that the document is driven further by means of the friction rollers 33 until it strikes against the upper stop 56, exceeds the culmination point and then drops down into the viewing station 45, where it is shown in the position drawn in a dash-dot line in FIG. 3. The viewing station 45 is defined by means of a stop plate 57 and wire stirrups 58 connected with the stop plate, the wire stirrups 58 being adjustably supported on short axles 59. The wire stirrups 58 are adjustable in order that the user can adjust the wire stirrups in such a way that they do not hinder the reading of the data from the document 43 in the viewing station. The wire stirrups 58 advantageously replace the glass panes which are usually provided and which hinder the reading of the document because of the mirroring effect.

The stop 56 is vertically adjustable in order to be able to take into account different document formats. FIGS. 2 and 3 show that the document viewing station is open at the top so that every document can be removed manually.

During the transporting of the document 43 by means of the belt 17, the document slides along a guide rail 34 via an elastic friction base 60. The reading head 61, which is held between holders 63 and 64 of a slide 65 by a projection 62, is arranged on the other side of the document 43. The slide 65 is transported on axles 66 and 67 in the line direction of the document 43. For reasons of clarity the transporting means are not shown here specifically. It is merely noted that the reading head 61 can be moved in reciprocating motion in the line direction by means of the corresponding drive means, wherein the pre-encoded data on the document are read in the reading station 44. The displacement of the reading head 61 relative to the document 43 is effected at such a speed that it is possible, in principle, to read the document 43 repeatedly while the preceding document is located in the viewing station 45. Moreover, the reading head 61 is vertically adjustable between the guides 63 and 64 so that coding lines of a different position can be read.

A contact pressure roller 70 (FIGS. 1A and 1B), which cooperates with a drive roller 71, serves to transport the document out of the viewing station 44. The drive roller 71 is driven by means of a belt 72 and belt wheels 73 and 74. The belt wheel 74 and the drive wheel 71 are supported on a swiveling lever 75 which is supported on the axle of the belt wheel 73. The swiveling lever is swiveled by means of an electromagnet 76 in such a way that the drive roller 71 engages with the contact pressure roller 70 and transports the document through the document input magazine 77 to the additional drive rollers 78, 79 and 80 which cooperate with contact pressure rollers 81, 82 and 83. A sensor 90 reports whether a document is still, or already, located in the viewing station 45. As the document continues to be transported it runs through the printing stations.

In addition, it can be seen from the drawings that the store station 1, the transporting means 5, 22, 23, 17 for the document 43 into the reading station 44, the separate transporting means for the shifting of the document and the viewing station 45 are constructed as a front and lower construction, respectively, for the actual encoding printer, which consists of the input station for the documents —the parts 71 to 83 and the adjoining printing stations.

The reading station 44 can be constructed for optical document reading and/or also for magnetic document reading.

What is claimed is:

1. Document encoding device with a reading station for the mechanical reading of pre-encoded marks, a viewing station following the reading station for stopping the document for the visual reading of handwritten marks, and at least one adjoining station following the viewing station for subsequent processing of said documents, transporting means for moving said documents between said reading, viewing and processing stations, wherein the improvement comprises that said transporting means comprises a first transporting means, a second transporting means, and a third transporting means, said document being moved by said first transporting means in a first transporting direction into said reading station, said documents being moved by said second transporting means in a second transporting direction transverse relative to said first transporting direction with the viewing and reading stations arranged one behind the other in a viewing direction generally transverse to the first transporting direction and with the viewing station arranged closer to a viewer relative to the reading station, and said third transporting means moving said documents from said viewing station to said at least one processing station.

2. Document encoding device according to claim 1 wherein said document reading station (44) is not only arranged behind said document viewing station (45), but is also arranged underneath the latter so as to be offset in such a way that when said document (43) is displaced by means of said second transporting means (32 to 42) there is effected not only a forward displacement, but also a lifting of said document to a second level in which are arranged said viewing station (45) and said at least one processing station.

3. Document encoding device according to claim 1, wherein said second transporting means comprise friction rollers (33) provided with serrated projections and arranged to engage with and are driven by contact pressure means (46) for the documents.

4. Document encoding device according to claim 3, wherein said friction rollers (33) are arranged in pairs at both side of a cut out portion (34) and in said contact pressure means (46) comprise pawls (47) which enter into said cut out portions (34) when said document is lifted correspondingly far.

5. Document encoding device according to claim 4, wherein said contact pressure means (46) are swivelable by an electromagnet (53) from an inactive position, in which the document transport is effect in the first transporting direction, and an active position in which said contact pressure means (46) are located one of against said document (43) and against said friction rollers (33).

6. Document encoding device according to claim 1, wherein a throwing out and tilting of said document during the drive by said second transporting means is prevented by a vertically adjustable stop (56) which defines the path of said document (43) at the top.

7. Document encoding device according to claim 1, wherein said viewing station (45) for said documents (43) is defined toward the front in the direction of the field of view of the user by wire stirrups (58) which do not prevent a reading of the data.

8. Document encoding device according to claim 7, wherein said wire stirrups (58) are laterally adjustable.

9. Document encoding device according to claim 1, wherein said viewing station (45) is open at the top and permits a removal of said document.

10. Document encoding device according to claim 3, wherein a reading device (61) is arranged in said reading station so as to be movable in the first transporting direction, while said document (43) is stationary.

11. Document encoding device according to claim 10, characterized in that said reading device (61) is arranged in said reading station (44) so as to be vertically adjustable.

12. Document encoding device according to claim 3, wherein a reading device (61) located in said reading station has at least one of a reading head for magnetic script and a reading head for optical document reading.

13. Document encoding device according to claim 3, wherein a document store station (1) is located upstream of said reading station with said first transporting means including a single feed device (22, 23) at said document store station, said first transporting means (5, 22, 23, 17) transports said document from said store station (1) into said reading station (44) and a reading device (61 - 67) at said reading station are component parts of a module arranged as a lower construction and a front construction for a encoding module with at least one processing station.

* * * * *